United States Patent [19]

Watanabe et al.

[11] Patent Number: 5,048,161

[45] Date of Patent: Sep. 17, 1991

[54] CONNECTOR WITH LOCK ONTO PANEL

[75] Inventors: Hiroshi Watanabe; Naoto Taguchi; Katsuaki Terada, all of Shizuoka, Japan

[73] Assignee: Yazaki Corporation, Tokyo, Japan

[21] Appl. No.: 526,013

[22] Filed: May 21, 1990

[30] Foreign Application Priority Data

May 25, 1989 [JP] Japan .............................. 1-59674[U]
Jul. 17, 1989 [JP] Japan .............................. 1-83023[U]

[51] Int. Cl.$^5$ .............................................. F16B 13/00
[52] U.S. Cl. ................................. 24/704.1; 24/669; 403/393
[58] Field of Search ...................... 24/704.1, 297, 289, 24/669; 403/393, 375, 330

[56] References Cited

U.S. PATENT DOCUMENTS

| 1,423,590 | 7/1922 | Zimmerman | 24/669 |
| 3,095,625 | 7/1963 | Propst | 24/704.1 |
| 3,239,988 | 3/1966 | Meyer | 24/297 |
| 4,305,182 | 12/1981 | Peterson | 24/297 |
| 4,861,183 | 8/1989 | Loos | 403/393 |

FOREIGN PATENT DOCUMENTS 0191851 9/1985 Japan ........................................ 24/289

Primary Examiner—Victor N. Sakran

[57] ABSTRACT

A connector having an improved mechanism for its lock onto a panel. A housing of the connector has a wall on which a sliding rail capable of slidingly fitting onto guide rails of the panel is provided. A flexible engagement member having an engagement projection engageable with an engagement projection of the panel is formed in a portion of the wall by cutting a part of the wall. When the sliding rail is slid on the guide rail to fit thereon, the flexible engagement member is deformed and has its position changed toward the inside of the housing while its engagement projection abuts on the engagement projection of the panel until the member recovers its original position upon the engagement between the projections. The arrangement of the flexible engagement member is advantageous in that it does not require any deformation distance to be provided on the outside of the housing, thereby enabling the entire connector to be compact. The member may be provided with lock release portions engageable with a lock release instrument inserting into the inside of the housing. With this arrangement, the connector can be easily released from its state of being locked.

7 Claims, 5 Drawing Sheets

CONNECTOR WITH LOCK ONTO PANEL

BACKGROUND OF THE INVENTION

1. Field of the Invention

The present invention relates to a connector and, more specifically, to a connector having a mechanism for mounting the connector onto a mounting panel and for locking the connector in its mounted state.

2. Description of the Related Art

An example of a conventional connector with a lock onto a panel is shown in FIG. 7, together with a mounting panel. In this example, a connector 11 with a lock onto a panel has a housing 12, and a wall 13 of the housing 12 on which are provided a pair of sliding rails 14 as well as a flexible engagement arm 15 being cantilevered by the wall 13 at an intermediate position between the rails 14 and projecting therefrom. An engagement projection 16 is formed on the surface of the flexible engagement arm 15, the projection 16 having an upper slope surface 16a retracting upward, and a normal stopper surface 16b which is normal to the surface of the arm 15 and continues from the slope surface 16a.

On the other hand, a mounting panel 17 has a pair of guide rails 18 corresponding to the sliding rails 14 of the connector 11, a guide 19, and an engagement projection 20 provided at an intermediate position between the guide rails 18 and engageable with the engagement projection 16.

When the sliding rails 14 of the connector 11 are slidingly fit into the gaps between the guide rails 18 and the guide 19 of the mounting panel 17, the engagement projection 16 of the flexible engagement arm 15 is brought into engagement with the engagement projection 20 of the panel 17 in the manner shown in FIG. 8. Specifically, the upper slope surface 16a of the engagement projection 16 abuts on the engagement projection 20, thereby causing the arm 15 to be deformed toward the wall 13 of the housing 12 until the projection 16 clears the projection 20. Upon clearing, the arm 15 recovers its original position by virtue of its resilience, whereby the normal stopper surface 16b is brought into and kept in contact with a surface of the projection 20.

However, the conventional connector 11 with the lock onto the panel has the following drawback. Since the distance L through which the flexible engagement arm 15 is allowed to deform must be provided in the direction normal to the wall 13 of the connector housing 12, it is inevitably required that the portion P' at which the connector 11 is locked onto the panel 17 should project from the housing 12 by a large dimension. This requirement makes the entire connector 11 large-sized.

SUMMARY OF THE INVENTION

In view of the above-described points, the present invention has been accomplished to provide a connector with a lock onto a panel that has an improved lock onto the panel which is provided on the connector housing, the connector being compact yet capable of easy release from the lock.

In order to achieve the above-stated object, according to the present invention, there is provided a connector having a housing and a sliding rail provided on a wall of the housing and capable of sliding on guide rails of a mounting panel to fit thereon. The basic arrangement of the connector is such that a flexible engagement member is formed in a portion of the wall of the housing by cutting a part of the wall, an engagement projection capable of engaging with an engagement projection of the mounting panel is provided on the flexible engagement member, and, when the engagement projection of the connector is brought into engagement with the engagement projection of the panel, the flexible engagement member is deformed and has its position changed toward the inside of the connector housing.

Another arrangement may be adopted, wherein a lock release means capable of entering the inside of the housing is provided on the flexible engagement member.

With the above-described arrangement, when the sliding rail on the connector housing is slidingly fit onto the guide rails of the mounting panel, the flexible engagement member of the connector has its engagement projection abutted on the engagement projection of the panel to become deformed and have its position changed toward the inside of the housing. Since the flexible engagement member is formed by cutting a part of the wall of the housing, no part of the member projects to the outside of the housing and occupies an outer-housing space.

If a lock release means is provided, when it is operated from the inside of the housing in such a manner as to cause the flexible engagement member to be deformed, with a part of the member being positioned inside the housing, it is possible to release the engagement between the connector projection and the panel projection.

BRIEF DESCRIPTION OF THE DRAWINGS

The above and other objects, features and advantages of the invention will become more apparent from the following detailed description when it is read with reference to the drawings, in which.

DESCRIPTION OF THE PREFERRED EMBODIMENTS

Figure 1:
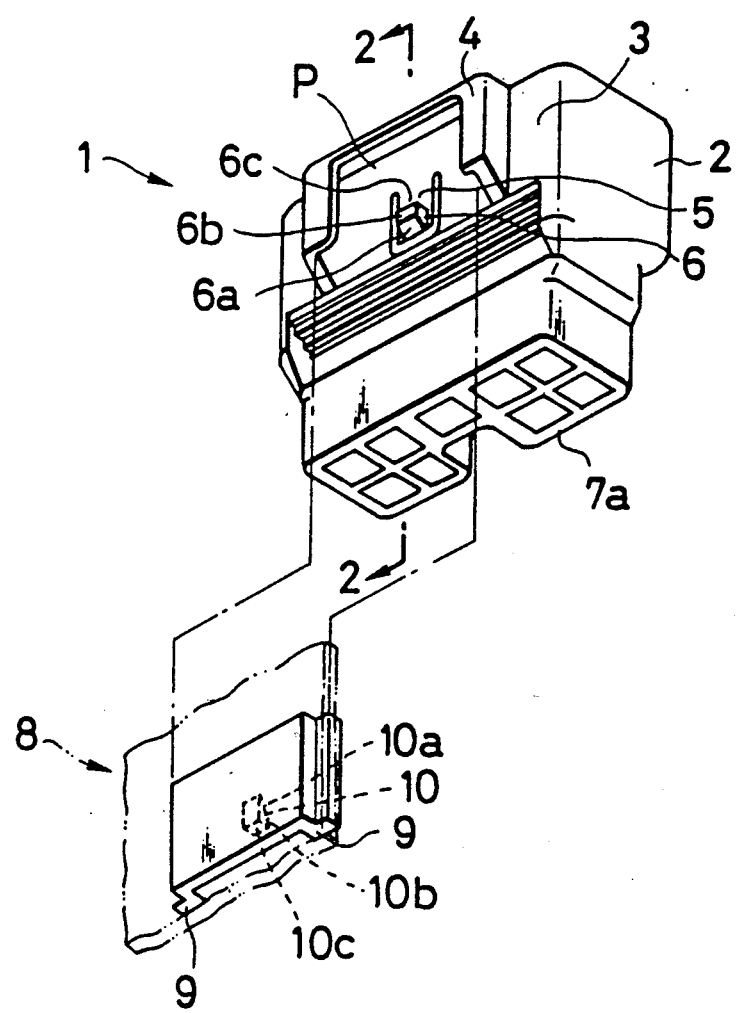
FIG. 1 is an exploded perspective view of a connector with a lock onto a panel and a mounting panel, showing one embodiment of the present invention.
Figure 2:
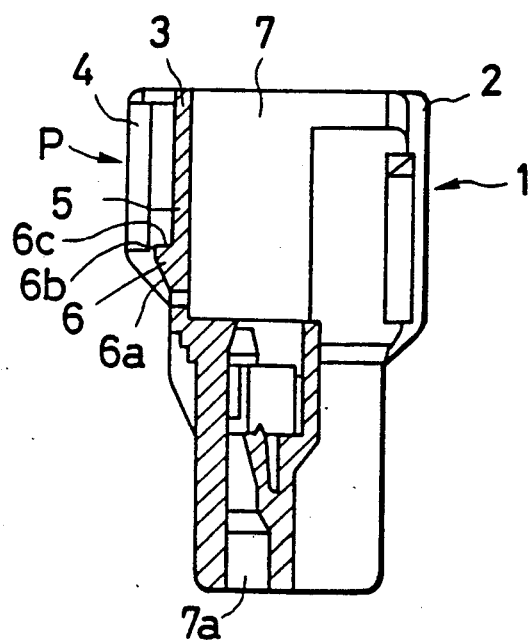
FIG. 2 is a vertical sectional view of the connector shown in FIG. 1 taken along the line 2—2 shown in FIG. 1.

Referring to FIGS. 1 to 3, a connector 1 with a lock onto a panel according to one embodiment of the present invention includes a housing 2 formed of a synthetic resin. The inside of the housing 2 defines a terminal receiving chamber 7a on one side, and a receiving space 7 on the other (see FIG. 2) into which the housing of a male connector (not shown) is fit to establish connection between the connectors. The walls of the housing 1 which enclose the receiving space 7 include a side wall serving as a bulging hood wall 3. So long as the housing 2 has the hood wall 3, the housing 2 may be either a male housing or a female housing.

On the outer surface of the hood wall 3 of the housing 2, a substantially U-shaped sliding rail 4 integrally projects from the outer surface of the wall 3 in such a manner as to surround edges of a portion of the wall 3. In the center of the hood wall 3, a flexible engagement member 5 is formed by cutting a substantially U-shaped slit around a central portion of the wall 3. Thus, the member 5 is partially separated from the remaining portion of the wall 3, and has a distal end positioned at the bottom of the U-shape.

An engagement projection 6 is integrally formed on the outer surface of the flexible engagement member 5 and at a position close to the distal end of the member 5. The engagement projection 6 includes a lower slope surface 6a being close to the distal end of the member 5 and extending outward and upward from the lower end of the projection 6, a crest surface 6b continuing from the slope 6a, and a stopper surface 6c normal to the outer surface of the member 5. The flexible engagement member 5 has resilience in the direction normal to the plane defined by the hood wall 3 of the housing 2.

A mounting panel 8 has a surface on which are provided a pair of guide rails 9 projecting from the surface and corresponding to the sliding rail 4 of the connector housing 2, as well as an engagement projection 10 at an intermediate position between the guide rails 9 which corresponds to the engagement projection 6 of the connector 1. The engagement projection 10 of the panel 8 has a configuration similar to that of the connector engagement projection 6, and it includes an upper slope surface 10a sloping down outward in compliance with the lower slope surface 6a of the connector engagement projection 6, a crest surface 10b continuing from the upper slope surface 10a, and a stopper surface 10c normal to the surface of the panel 8.

Figure 3A:
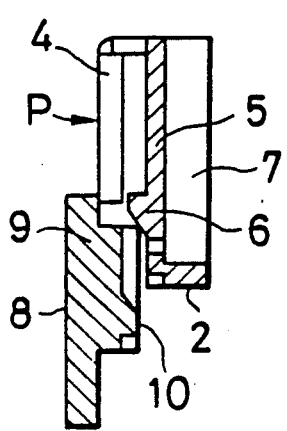
FIGS. 3A, 3B and 3C are sectional views showing different states during the fitting of a panel lock portion of the connector onto the mounting panel.
Figure 3B:
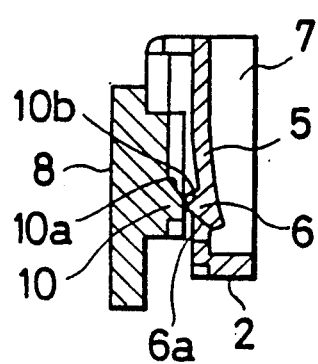
Figure 3C:
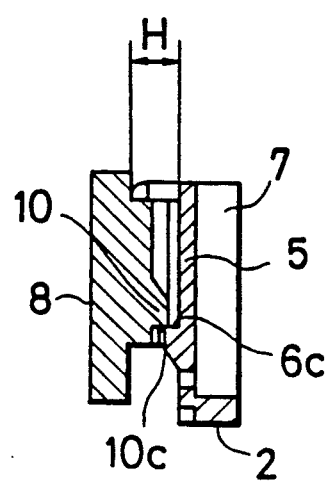

FIGS. 3A to 3C show different states during the fitting of a panel lock portion P of the connector 1 onto the mounting panel 8.

When the sliding rail 4 of the connector 1 is slidingly fit onto the guide rails 9 of the panel 8 from above, as shown in FIG. 3A, the engagement projection 6 of the flexible engagement member 5 of the connector 1 is brought into engagement with the engagement projection 10 of the mounting panel 8 in the following manner. First, as shown in FIG. 3B, the connector engagement projection 6 has its lower slope surface 6a slid on the upper slope surface 10a of the panel engagement projection 10 to abut on the crest surface 10b of the projection 10. During this action, the flexible engagement member 5 deforms toward the receiving space 7 of the housing 2, with its engagement projection 6 partially positioned in the space 7. Subsequently, the connector engagement projection 6 clears the crest surface 10b of the panel engagement projection 10, whereupon the flexible engagement member 5 recovers its original position by virtue of its resilience. As the member 5 recovers its original position, the connector engagement projection 6 has its stopper surface 6c brought into contact with the stopper surface 10c of the penal engagement projection 10, whereby the connector and panel projections 6 and 10 become mutually engaged, as shown in FIG. 3C. When the connector 1 has thus been mounted and locked onto the panel 8, the male connector (not shown) is fitted into the space 7 of the housing 2.

With the above-described arrangement, the flexible engagement member 5 does not project to the outside of the connector housing 2, and the deformation of the member 5 occurs toward the space 7 inside the housing 2. Therefore, it is possible to set the dimension by which the panel lock portion P projects at a value within a range limited by the minimum necessary height H (see FIG. 3C) of the sliding rail 4 above the wall 3.

In the event that the connector engagement projection 6 has brought into incomplete engagement with the panel engagement projection 10, this results in a part of the flexible engagement member 5 projecting into the space 7 in a manner similar to that shown in FIG. 3B. If such is the case, since the connector to be connected with the connector 1 cannot be properly fit into the receiving space 7, it is possible to check the locked state of the connector 1.

Figure 4:
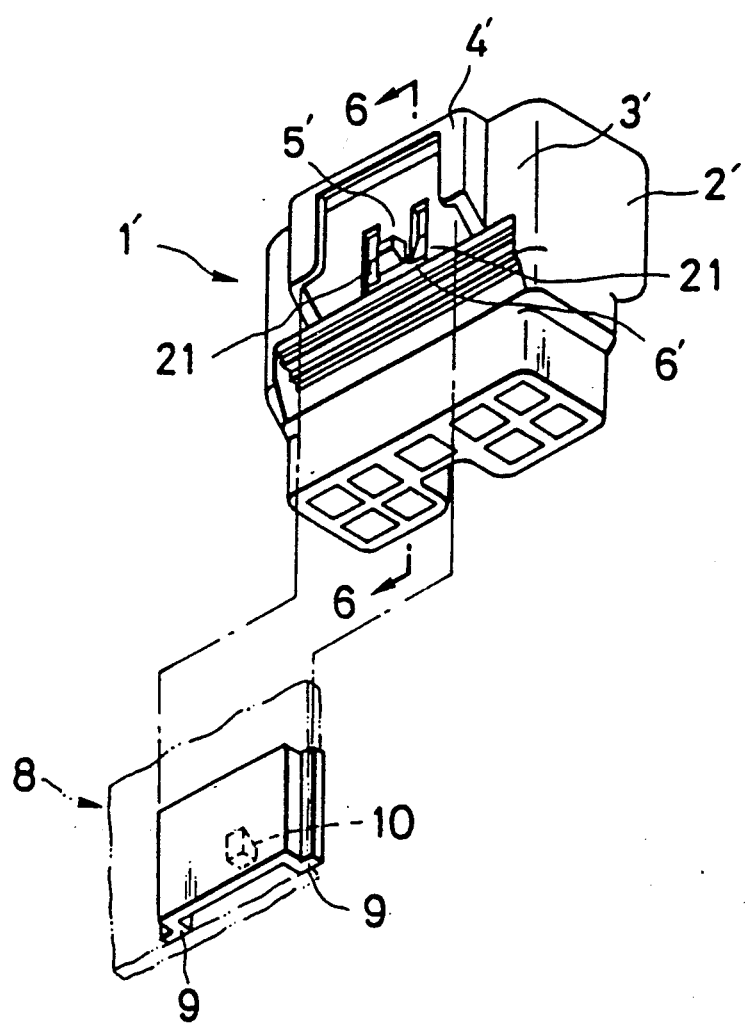
FIG. 4 is a view corresponding to FIG. 1, showing another embodiment of the present invention.
Figure 5:
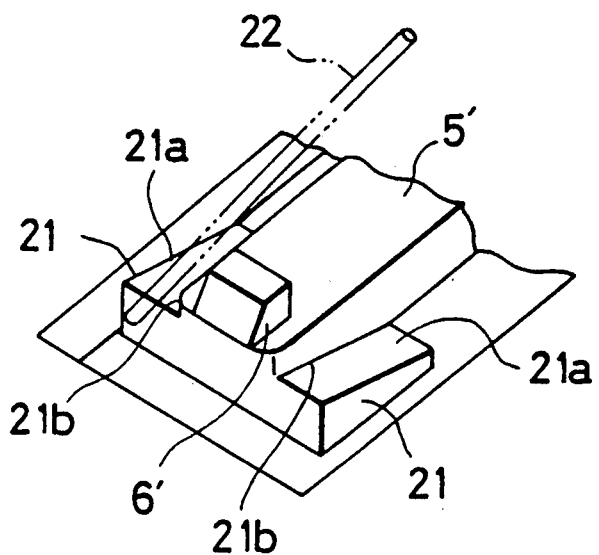
FIG. 5 is an enlarged perspective view of a lock release mechanism of the connector shown in FIG. 4.

FIG. 4 shows a connector with a lock onto a panel according to another embodiment of the present invention, in which a lock release mechanism is added. FIG. 5 shows the lock release mechanism on an enlarged scale.

In this embodiment, a connector 1' with a lock onto a panel is characterized by a flexible engagement member 5' formed by cutting a substantially U-shaped slit around a central portion of a hood wall 3' of a connector housing 2', and lock release portions 21 being integrally formed on the member 5' and projecting from the distal end portion of the member 5'.

An engagement projection 6', similar to that of the connector 1, is integrally formed on the outer surface of the flexible engagement member 5' and at a position close to the distal end of the member 5'. The flexible engagement member 5' provided with the lock release portions 21 has resilience in the direction normal to the hood wall 3', and it is capable of deforming toward the side inward of the wall 3', i.e., toward a space 7' allowing the fitting therein of another connector (not shown) to be connected with the connector 1', with a part of the member 5' positioned within the space 7'. The lock release portions 21 project from either side of the distal end portion of the flexible engagement member 5'. Each lock release portion 21 includes an outer slope surface 21a sloping down as the thickness of the portion decreases inward from the end of the portion at the distal end of the member 5'. Furthermore, each lock release portion 21 is thinner than the flexible engagement member 5', with a stepped portion 21b being provided therebetween. The stepped portions 21b help the lock release portions 21 into engagement with a lock release instrument 22 during a lock release operation.

The connector 1' also has a sliding rail 4', similar to that of the connector 1, which is capable of slidingly fitting onto the guide rails 9 of the mounting panel 8. During this action, the engagement projection 6' of the flexible engagement member 5' is brought into engagement with the engagement projection 10 of the mounting panel 8.

Figure 6A:
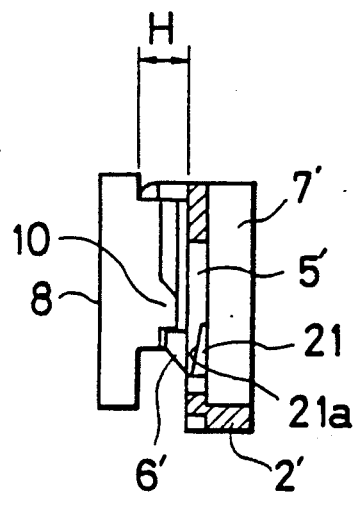
FIGS. 6A and 6B are sectional views showing states before and during a lock release operation, respectively, taken along the line 6—6 shown in FIG. 4.
Figure 6B:
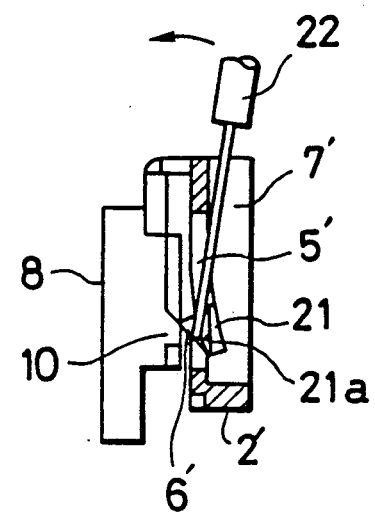
Figure 7:
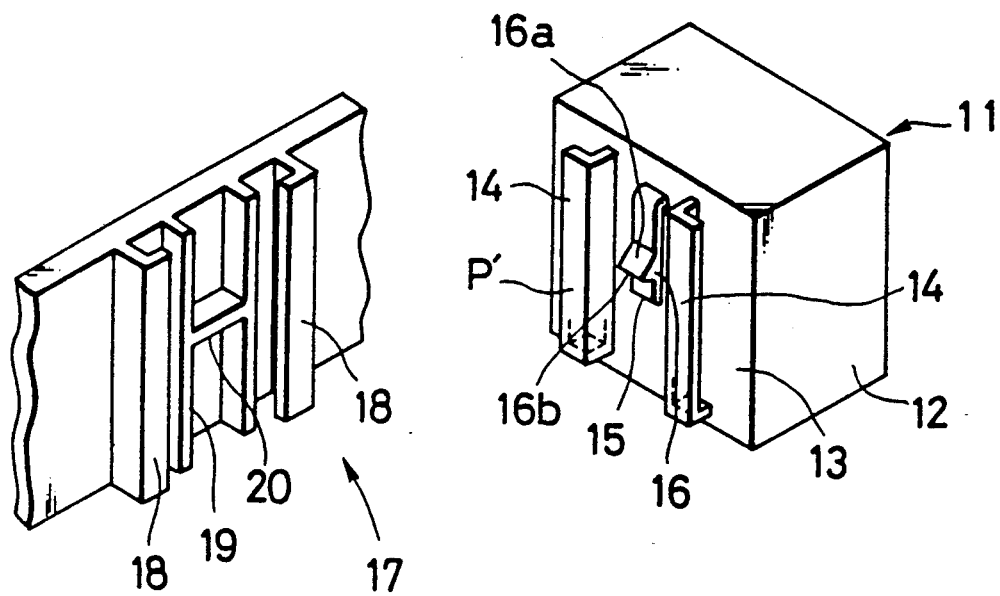
FIG. 7 is a perspective view of an example of a conventional connector with a lock onto a panel and a mounting panel, showing the connector as being dismounted from the panel.
Figure 8:
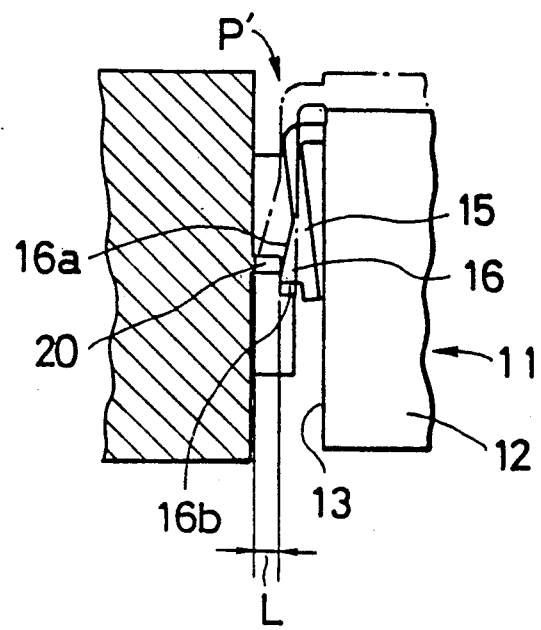
FIG. 8 is a vertical sectional view showing the fitting of a panel lock portion of the connector onto the panel.

FIG. 6A is a sectional view (taken along the line 6—6 shown in FIG. 4) showing the state resulting from the abovedescribed sliding fit. FIG. 6B shows a state during a lock release operation. Specifically, from the state shown in FIG. 6A, the lock release instrument 22 is inserted into the space 7' of the housing 2' so as to cause the lock release portions 21 to be displaced toward the space 7', hence, cause the flexible engagement member 5' to be partially deformed toward the space 7', whereby the connector engagement projection 6' is released from its engagement with the panel engagement projection 10. Since the lock release portions 21 have the slope surfaces 21a sloping down as the thickness of the portions decreases inwardly from the ends at the distal end of the member 5, this facilitates the insertion of the lock release instrument 22. Even when the distance H (see FIG. 6A) between the connector housing 2' and the panel lock 8 is narrow, the connector 1' can be easily released from its locked state by a simple operation from the inside of the housing 2'.

As described above, since the flexible engagement member on the housing of the connector is formed by cutting a part of the wall of the housing, the member does not project to the outside of the housing, thereby enabling a reduction in the space occupied by the connector. During the fitting of the connector onto the panel, the flexible engagement member is deformed and has its position changed toward the inside of the housing, thereby eliminating the need for a distance allowing the deformation of the flexible engagement member to be provided on the outside of the housing. By virtue of the above-described arrangement, the entire connector can be compact.

What is claimed is:

1. A connector capable of mounting and locking onto a mounting panel, comprising:
    a housing having a wall;
    a sliding means provided on said wall and capable of slidingly fitting on a guide means provided on a mounting panel onto which said connector is to be mounted; and
    a flexible engagement member formed in a portion of said wall by cutting a part of said wall, said member having an engagement projection capable of engaging with an engagement projection provided on said mounting panel, said member being deformed and having its position changed toward the inside of said housing when said engagement projections are brought into engagement with each other;
    wherein said sliding means comprises a substantially U-shaped sliding rail integrally projecting from the outer surface of said wall of said housing in such a manner as to surround edges of a portion of said wall; and
    wherein said flexible engagement member is formed by cutting a substantially U-shaped slit around a central portion of said wall, said member having a distal end positioned adjacent the ends of the U-shape slit.

2. A connector according to claim 1, wherein said engagement projection of said flexible engagement member is integrally formed on the outer surface of said member at a position adjacent said distal end of said member.

3. A connector according to claim 1, further comprising a lock release means provided on said flexible engagement member in such a manner as to project from said member, said lock release means being capable of entering the inside of said housing.

4. A connector capable of mounting and locking onto a mounting panel, comprising:
    a housing having a wall;
    a sliding means provided on said wall and capable of slidingly fitting on a guide means provided on a mounting panel onto which said connector is to be mounted;
    a flexible engagement member formed in a portion of said wall by cutting a part of said wall, said member having an engagement projection capable of engaging with an engagement projection provided on said mounting panel, said member being deformed and having its position changed toward the inside of said housing when said engagement projections are brought into engagement with each other; and
    a lock release means provided on said flexible engagement member in such a manner as to project from said member, said lock release means being capable of entering the inside of said housing;
    wherein said sliding means comprises a substantially U-shaped sliding rail integrally projecting from the outer surface of said wall of said housing in such a manner as to surround edges of a portion of said wall;
    wherein said flexible engagement member is formed by cutting a substantially U-shaped slit around a central portion of said wall, said member having a distal end positioned adjacent the ends of the U-shape slit; and
    wherein said lock release means comprises portions projecting from either side of the distal end portion of said flexible engagement member, each of the projecting portions having a slope surface sloping downward such that the thickness of the projecting portion decreases from the said distal end of said member.

5. A connector according to claim 4, wherein said lock release projecting portions are thinner than said flexible engagement member, whereby stepped portions are formed between said lock release projecting portions and said flexible engagement member.

6. A connector having a mechanism for mounting and locking said connector onto a panel having a surface on which are provided a pair of guide rails and an engagement projection at an intermediate position between the rails, said connector comprising:
    a housing having a bulging wall and defining therein a space into which a second connector may be fit;
    a substantially U-shaped sliding rail integrally provided on the outer surface of said wall in such a manner as to surround edges of a portion of said wall, said sliding rail being capable of slidingly fitting onto said guide rails of said panel;
    a flexible engagement member formed in a portion of said wall by cutting a substantially U-shaped slit around a central portion of said wall, said member having an engagement projection formed on the outer surface thereof and capable of engaging with said engagement projection of said mounting panel, said member being deformed and having its position changed toward said space of said housing when said engagement projections are brought into engagement with each other; and
    projecting portions on either side of the distal end portion of said flexible engagement member, each of said projecting portions having a slope surface sloping downward such that the thickness of the projecting portion decreases from said distal end, wherein said projecting portions are capable of engaging with a lock release instrument inserted into said space of said housing, the engagement causing said flexible engagement member to deform toward said space so that said engagement projection of said member is released from its engagement with said engagement projection of said panel.

7. A connector according to claim 6, wherein said engagement projection of said panel includes a first normal surface normally extending from the panel surface, a first crest surface continuous with said normal surface and parallel with said panel surface, and a first slope surface extending from said crest surface to said panel surface;

wherein said engagement projection of said flexible engagement member includes a second slope surface extending outward and upward from the lower end of said projection as to be complementary with said first slope surface, a second crest surface continuous with said second slope surface and parallel with the outer surface of said flexible engagement member, and a second normal surface extending from said second crest surface and being normal to said surface of said member, said normal surface being capable of contacting with said first normal surface.

* * * * *